United States Patent [19]

Fuminier

[11] Patent Number: 4,541,316
[45] Date of Patent: Sep. 17, 1985

[54] METHOD AND APPARATUS FOR CUTTING CIRCULAR OR OVAL PIPES

[75] Inventor: Claude Fuminier, Pont A Mousson, France

[73] Assignee: Pont A Mousson S.A., France

[21] Appl. No.: 532,630

[22] Filed: Sep. 15, 1983

[30] Foreign Application Priority Data

Sep. 29, 1982 [FR] France ................................. 82 16390

[51] Int. Cl.$^4$ ........................... B23B 3/04; B23B 5/14
[52] U.S. Cl. .......................................... 82/59; 82/35; 82/100; 82/101
[58] Field of Search ...................... 82/47, 48, 98, 100, 82/101, 102, 35, 59

[56] References Cited

U.S. PATENT DOCUMENTS

| 2,473,418 | 6/1949 | Fellroth | 82/35 |
| 3,164,062 | 1/1965 | Hogden et al. | 82/4 C |
| 3,807,047 | 4/1974 | Sherer et al. | 82/4 C |
| 3,985,051 | 10/1976 | Brown | 82/101 |
| 4,429,445 | 2/1984 | Fuminier | 29/33 T |

FOREIGN PATENT DOCUMENTS

| 2306814 | 11/1976 | France | 82/101 |
| 2306813 | 11/1976 | France | 83/54 |
| 2471244 | 6/1981 | France | 82/101 |
| 2027380 | 2/1980 | United Kingdom | |

Primary Examiner—Francis S. Husar
Assistant Examiner—William E. Terrell
Attorney, Agent, or Firm—Sughrue, Mion, Zinn, Macpeak, and Seas

[57] ABSTRACT

Cutting tools 12 are individually connected in common to rollers 2b supporting a rotationally driven tube T to be cut. The tools and rollers are paired mechanically such that the cutting edge of each tool and the tangent point G between the associated roller and the surface of the tube lie in the same radial plane passing through the longitudinal axis T—T of the tube. This arrangement makes it possible to maintain constant the penetration depth of the cutting tools into the surface of the tube even if the tube is oval or elliptical.

10 Claims, 8 Drawing Figures

METHOD AND APPARATUS FOR CUTTING CIRCULAR OR OVAL PIPES

BACKGROUND OF THE INVENTION

The object of the present invention is a process for cutting tubes made of rigid material, notably, metal fibrocement, concrete, and plastics, particularly those having an out-of-round or oval cross-section, and means for putting said process into practice.

More specifically, the process and means contemplated by the invention make it possible not only to cut a tube but simultaneously to bevel its cut end, if necessary, to a predetermined shape. The means can be automatically adapted to the various possible diameters of the pieces to be cut without any loss of time.

French Pat. No. 79 30 754 (No. 2,471,244) describes means for cutting tubular products using radial cutting tools that are practically silent and do not release any dust. Said means remove the disadvantages (noise, dust, risk and inaccuracy) of cutting systems that make use of grinding disks. Furthermore, said means make it possible, in a simple kinematic fashion, to vary the speeds of approach, penetration, and backing off of the cutting tools relative to the axis of the tube being out, which is rotated by a revolving chuck.

However, with the cutting means described in this patent, if the tube to be cut is out-of-round or oval, the distance each cutting tool must travel to cut through the surface of the tube varies according to the radius of the oval section the tool faces, whereas progress toward the axis of rotation remains constant. The penetration of each cutting tool into the tube surface is therefore irregular, with a corresponding irregularity in the contour of the bevel obtained.

The apparatus described in French Pat. No. 76 09 87 (No. 2,306,814), which is adapted particularly to the cutting of plastic tubes includes rollers for centering the tube and a cutting tool disposed between the two upper rollers. It has the same disadvantage of irregular penetration of the edge of the cutting tool into the tube when that tube is oval or elliptical.

French Pat. No. 2,306,814 describes means adapted for cutting of pipes of various diameters in which the revolving pipe is borne by six rollers disposed coaxially to said pipe. The two lower rollers are mounted on a movable carriage that moves not radially but vertically, making it possible to move the pipe closer to or further away from the upper rollers when the diameter of the pipe is changed. The cutting tool, which is not paired with the upper rollers, is mounted on an independent support that can be moved vertically between the two upper rollers. However, the rollers are mounted in pairs, the center-to-center distance of which is fixed: a pair of upper rollers, a pair of lower rollers, and a pair of side rollers, Only the lower pair of rollers is mounted so as to move on a carriage that adjusts the pipes of different diameters by moving vertically.

When the lower rollers are moved closer to the upper rollers, there is a risk of crushing the tube into an oval shape, which is obviously a serious drawback. Furthermore, as indicated above, this prior art device does not allow an oval section of tube to be surrounded while maintaining contact with it over its entire periphery. This is due to the rigid mounting of the support rollers. In such a case, any bevel obtained will not be regular.

SUMMARY OF THE INVENTION

An object of the invention is to do away with these disadvantages through a process and means for practicing the process that can cut tube-shaped pieces with a cut that will be regular over the entire periphery of the section whether the tube's cross-section is a perfect circle, an oval, or even an ellipse. Under these circumstances, it is possible under the invention to give the cut end a bevel of perfectly regular shape. Said process and the means for its use are universal in that may be used to cut all types of tube-shaped pieces within a wide range of diameters.

Another purpose of the invention is to make it possible to cut as wide a range as possible of tubular products of various diameters without manual intervention or loss of time, while retaining the advantages of the aforementioned process.

The cutting process contemplated by the invention uses a frame provided with rollers mounted concentrically around the tube-shaped piece, which is supported by said rollers. Means are provided to cause at least some of the rollers to rotate so as to turn the tube about its axis while it is held translationally stationary. Cutting is done by means of at least one cutting tool having a cutting edge that lies in a radial plane passing through the axis of the tube.

According to the invention, each cutting tool is connected to a roller. Tool and roller are paired mechanically in such a way that the cutting edge of the tool and the point of contact between the revolving roller and the outer surface of the tube-shaped piece to be cut lie essentially in the same radial plane passing through the longitudinal axis of the cut tube. With the roller held in contact against the tube during rotation of said tube, the cutting tool is advanced through the piece being cut up to a preset distance, with penetration of the tool edge into the surface of the piece thereby remaining constant over the entire periphery of the latter whether or not its radius of curvature varies, and in particular whether or not it is oval.

BRIEF DESCRIPTION OF THE DRAWINGS

Other features and advantages of the invention will become apparent in reading the description that follows, which is made with reference to the appended drawings illustrating one embodiment by way of non-limiting example.

DETAILED DESCRIPTION OF THE PREFERRED EMBODIMENTS

Figure 1:
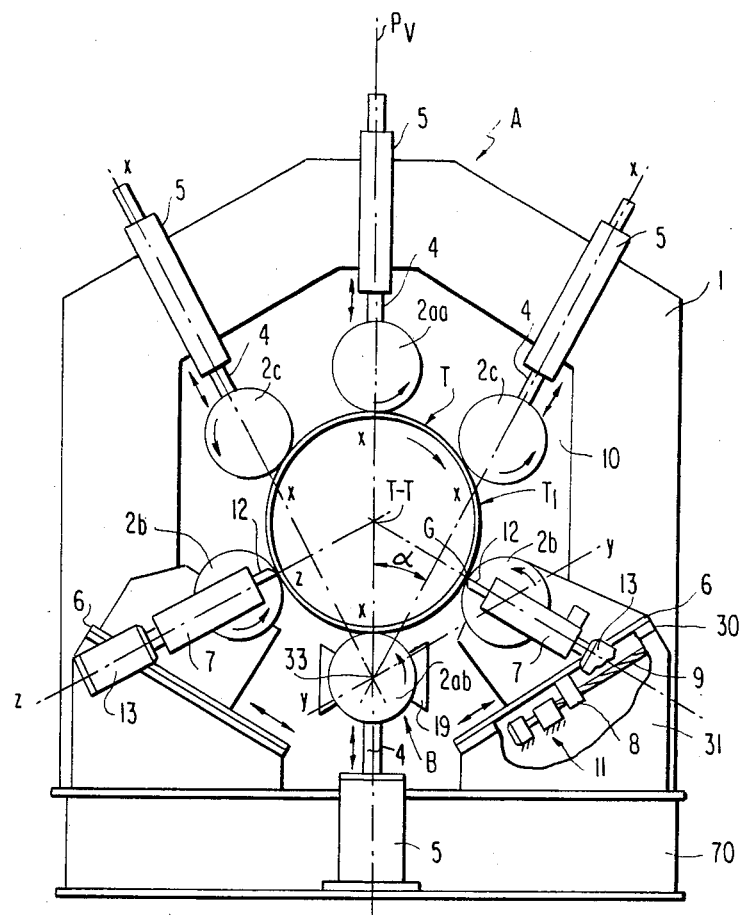
FIG. 1 is an end-view schematic elevation, partially cut away, of one embodiment of means for cutting according to the invention.

The elements shown in the drawings are intended to cut a tubular piece T, preferentially, but not necessarily, with a bevel of a given shape at the cut end, with the tubular piece T made of a rigid material, particularly metal, fibrocement, concrete, or plastic. Piece T may be an iron socket pipe having a perfectly circular, an oval or an ellipitcal cross-section.

Description of Apparatus

The apparatus has three principal parts:
(a) the cutting means themselves A, represented particularly in FIGS. 1 and 2;
(b) vertical handling means B (FIGS. 1 and 2) for handling a tube or pipe to be cut; and
(c) axial support means C (FIGS. 2, 4 and 5) for supporting a piece T that is to be cut.

Figure 2:
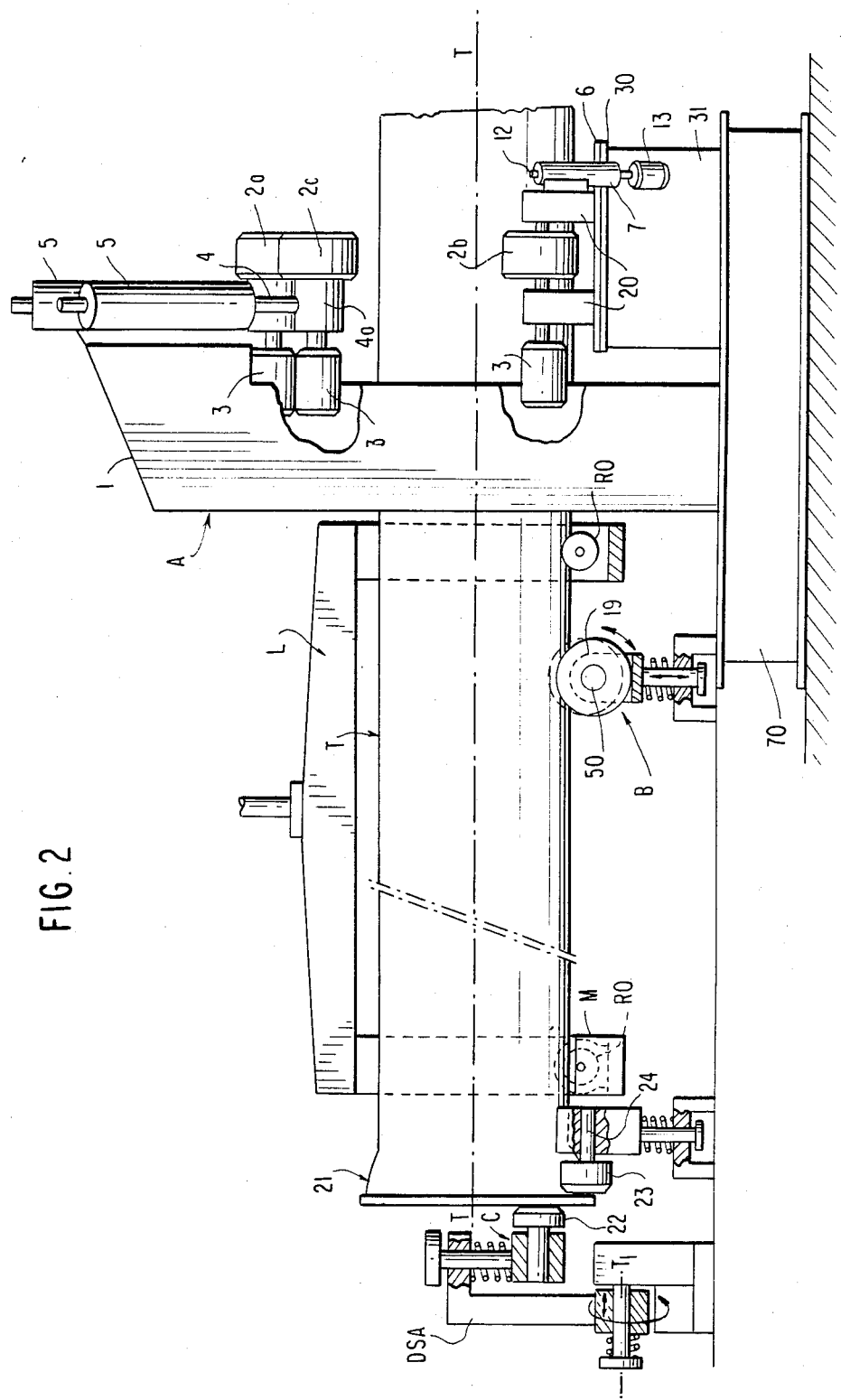
FIG. 2 is a simplified longitudinal elevation, with cutaways of the cutting means of FIG. 1.

The portion of the apparatus comprising the means for cutting a tube is shown in FIGS. 1 and 2 and comprises a stationary frame 1 containing an opening 10 through which passes the tube T to be cut. The tube T is disposed horizontally. In this embodiment, opening 10 has a hexagonal outline corresponding more or less to the outer circumference of frame 1, which rests on a pedestal 70. In this embodiment, the device is equipped with six revolving rollers 2aa, 2ab, 2b, 2c that support the tube T. One upper roller 2a is located above the tube T. The axis of this roller lies in the vertical plane $P_V$ containing the longitudinal axis T—T of the tube T. The angular position of this and the other rollers will be given hereinafter with reference to the hours on a clock. Thus, upper roller 2aa is at twelve o'clock. A lower roller 2ab is located under the tube T, which rests on said roller, the axis 33 of which lies in the plane $P_V$. The lower roller 2ab is situated at six o'clock. Two lower side rollers 2b are located at eight o'clock and four o'clock and are mechanically paired with a cutting tool 12 as explained in detail later on. Two upper side rollers 2c are situated at ten and two o'clock. When tube T to be cut is in place in device A, it rests essentially on the three lower rollers 2ab and 2b, with the three upper rollers 2aa and 2c assuming the task of centering and, jointly with the other three rollers, rotating the tube T.

The set of rollers thus forms a crown consisting of three carrier-rollers 2ab, 2b and three gripping and centering rollers 2aa, 2c. Rollers 2aa, 2ab and 2c are fastened at the end of a rod 4 of actuator cylinders 5, with the three upper cylinders 5 being fastened to frame 1, while the one lower cylinder 5, carrying the lower, central roller 2ab, is housed within the pedestal 70. Cylinders 5 are double-action cylinders, preferentially pneumatic. Rollers 2aa, 2ab and 2c are fastened to their support rod 4 by means of a bushing 4a through which passes the power shaft of a motor 3 for driving the corresponding rollers 2aa, 2ab and 2c in rotation. The aforesaid rollers, along with the lateral rollers 2b, are disposed on the face of the frame 1 opposite the face through which the the tube T to be cut enters. The axes of all of the rollers 2aa, 2ab, 2b and 2c are parallel to the longitudinal axis T—T of the tube T.

According to an essential feature of the invention, the two rollers 2b located at four and eight o'clock are each mounted on a support 20 (FIG. 2) common to said roller 2b and the cutting tool 12 corresponding to that roller. Each roller 2b is thus supported on its axis of rotation by bearings in the two lateral supports 20 mounted on a carriage 6 that moves over a sloping surface 30 of a stationary box frame 31, itself resting on a pedestal 70. The sloping surface 30 is inclined at a suitable angle, e.g., appoximately 60 degrees, toward the vertical plane $P_V$ containing the axis T—T.

Each tool 12 is therefore mechanically paired with the corresponding lower side roller 2b supporting the tube T by means of their common support 20. Cutting edge 12a of tool 12 is positioned in such a way that it lies practically in the same plane, or in the immediate vicinity of the plane, that contains the tangent point G of contact between roller 2b and surface $T_1$ of tube T, as well as axis T—T of the latter (see especially FIG. 3). The edge 12a thus lies in the radial plane $P_R$ passing through the axis T—T and the tangent point G.

Each tool-holding carriage 6, as well as each tool 12 and roller 2b pair mechanically linked in the radial direction, may be moved along an axis y—y parallel to inclined surface 30. The two axes of displacement y—y converge on axis 33 of the lower center roller 2ab, or at least converge in the vicinity of said axis 33. Actuating cylinders 5 are preferentially pneumatic, enabling a slight retraction of rollers 2aa and 2ab in the vertical plane $P_V$ when the rollers are in contact with an oval portion of the tube being cut.

In the sample embodiment illustrated in the drawings, tool-holding carriage 6 is moved over the sloping surface 30 by means of a reduction gear group 11, shown in FIG. 1, fastened within the box frame 31. The gear group 11 turns a screw 9 provided with a nut 8 that is integral with carriage 6. The latter may therefore climb or descend the sloping surface 30 depending on the direction of rotation of the reduction gear group 11.

Figure 3:
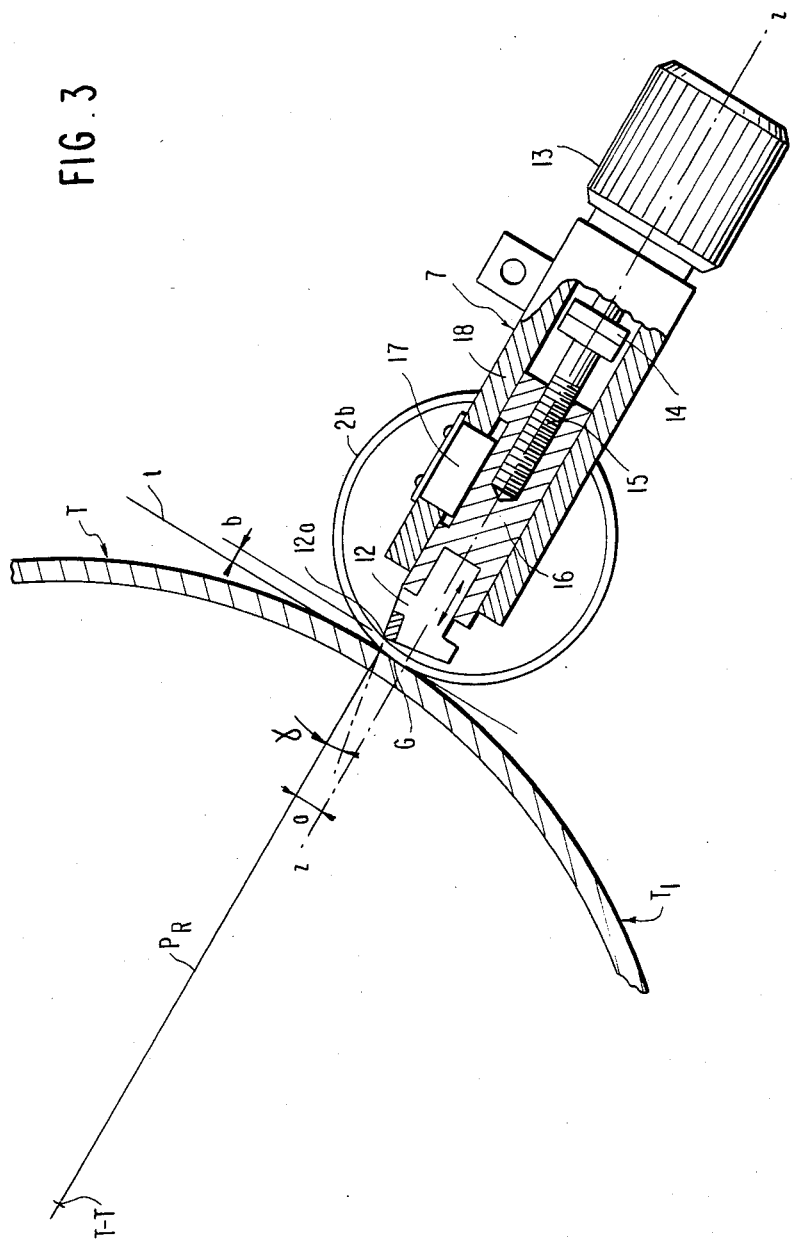
FIG. 3 is a half-elevated longitudinal half cross-section, on a larger scale, of a combination composed of a cutting tool and the associated roller applied against the surface of the tube-shaped piece to be cut by the means of FIGS. 1 and 2.

The tool 12 is mounted in a manner well known so as to slide within a support-piece 7 comprising a cylindrical sleeve 18, shown in FIG. 3, that contains a nut 16 capable of sliding within sleeve 18 and to which tool 12 is fastened. A screw 15 is axially engaged in the nut 16 and may be rotated by a coupler 14 that is integral with the output shaft of a motor 13 which may be of the stepper type, or of another type having an angular coder. With the tool-holding nut 16 keyed into sleeve 18 by a unit 17 that allows it a degree of translational freedom within the sleeve 18, the drive motor 13, depending on its direction of revolution, causes the advancement or retraction of the tool 12. This motion is represented by a double arrow in FIG. 3.

The cutting tool 12 moves along an axis z—z parallel to the radial plane $P_R$ that contains the axis T—T and the tangent point G and is separated from it by a distance a. The cutting edge 12a is formed in a well-known manner, e.g., of a tungsten carbide cartridge of a shape suitable not only for cutting a tube (cutting angle, taper), but also for cutting a desired profile (bevel, fillet, etc.) on the machining side of the outer portion of the tube T.

The outer face of the cutting cartridge, containing edge 12a is inclined by an angle of γ with respect to the radial plane $P_R$. This angle may be on the order of 6 degrees more or less.

Thus, the two cutting tools 12 are oriented along two axes of displacement z—z that intersect essentially at the tube's longitudinal axis T—T and are symmetrical with respect to the axial vertical plane $P_V$. In its waiting position, shown in FIG. 3, the cutting edge 12a of each tool 12 is backed off slightly from the tube T, at an extremely small distance b, less than 1 mm in practice, from the tangent line t at the point of contact of roller 2b and the tube T. The fact that distance b is extremely short advantageously reduces the time the tool 12 spends in idle translational motion.

The two lateral rollers 2c can be adjusted along displacement axes x—x which are perpendicular to the respective axes of rotation of the rollers 2c. The rollers 2c are disposed in a V formation and are symmetrical with respect to the axial vertical plane $P_V$ of piece T. Axes x—x are thus contained in a plane perpendicular to the vertical axial plane $P_V$ and intersect at axis 33 of the lower center roller 2ab, or at least near said axis, since, as explained above, when an oval section of the tube being cut passes over the lower roller 2ab the latter backs off slightly.

In other words, the axes of the actuating cylinders 5 of the upper side rollers 2c (ten and two o'clock) form a V, the tip of which is essentially at the center of roller 2ab (six o'clock). Thus, each axis x—x is inclined at an angle α (more or less equal to 30 degrees) relative to the vertical plane $P_V$, while axes z—z form a V whose arms are 120 degrees apart and whose center essentially falls at the tube's axis T—T.

Lastly, the upper and lower center rollers 2aa and 2ab are radially adjustable in axial vertical plane $P_V$, in which lie their respective control cylinders 5.

System B used for vertical handling of the tube T, in itself well-known, will be only briefly described with reference to FIGS. 1 and 2. Its function is the axial and horizontal positioning of the tube T just before and during its insertion between retracted rollers 2aa, 2ab, 2b and 2c of the cutting machine A. System B consists principally of a dolly 19 that turns freely about horizontal axis 50 and may be moved vertically and perpendicularly with respect to axis T—T by known means that are not shown.

During the cutting operation, dolly 19 is at the bottom of its travel, i.e., the radial and tangential lift lines of the two cone-shaped parts of the dolly 19 are not in contact with the tube T.

The handling system B is positioned between axial handling device C and cutting device A and is positioned closest to the latter.

Figure 4:
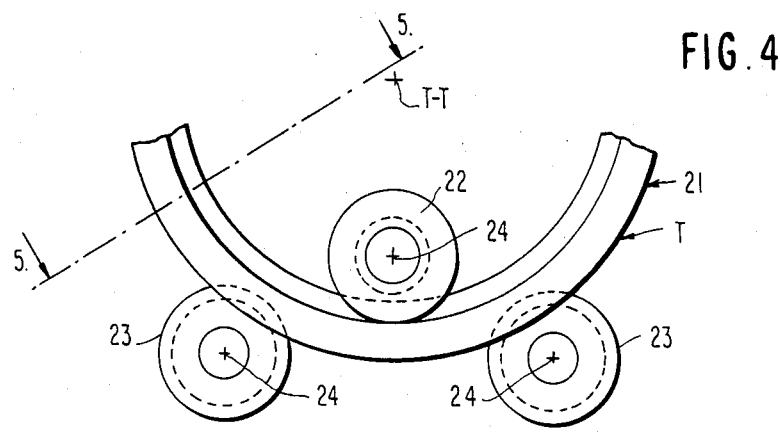
FIG. 4 is a partial, larger-scale (with respect to FIGS. 1 and 2) view of the end portion of the tube being cut, with the rollers for handling and axially maintaining the tube.
Figure 5:
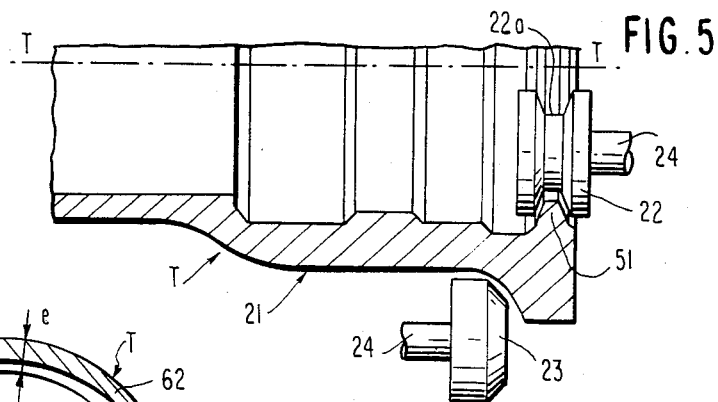
FIG. 5 is a partial, large-scale view in axial half cross-section taken along the line 5—5 of FIG. 4 of the end portion of the tube with the handling rollers and the axial maintenance roller.

The device C for axial handling and support of the pipe T shown in FIGS. 2, 4 and 5 makes it possible to introduce a desired length of tube T horizontally within the crown formed by retracted rollers 2aa, 2b, and 2c, and it supports the tube T axially during the cutting operation. The contoured end portion 21 (socket or joint) of the pipe T which is furthest from the cutting machine A rests on two support rollers 23 symmetric with respect to the axial vertical plane $P_V$. Axes of rotation 24 of rollers 23 are parallel to axis T—T. Rollers 23 turn freely about their axes 24.

According to a feature of the invention, the means for maintaining the axial position of the tube T further comprises a roller 22 disposed inside the tube T. The roller 22 has a central peripheral groove 22a shown in FIG. 5 to accept an annular flange 51 that forms the inner contour of joint 21. The cross-section of the protruding flange 51 may vary with the pipes being cut, but the shape of groove 22a is designed so as to permit the flange 51 to fit into it no matter what its shape. The shapes of groove 22a and the corresponding flange therefore interact so that roller 22 holds the pipe T securely against the support rollers 23. A well-known mechanism which is not shown in the figures supports rollers 22 and 23. Known means (not shown) perform the axial positioning of the pipe T and hold it during the cutting operation by use of rollers 22 and 23 that grip the end part 21.

Also shown in FIG. 2 is a lifting apparatus L supporting the pipe T by means of rollers R0 supported by a pair of arms on one side of the pipe T. One of the rollers R0 is connected to a motor M so as to translationally drive the pipe T parallel to the axis T—T. Thus, in order to introduce the pipe T through the opening 10 of the housing 1, the roller 22 is completely retracted by pivoting an arm DSA by 90°. The pipe T is then brought up by means of the lifting apparatus L until it rests on the dolly 50. The roller 23 is retracted by its spring. The pipe T is moved axially by means of the driving motor M to position it for the correct length of cut pipe. The axial movement of the pipe T is is through the opening 10 of the housing 1. When the correct axial position of the pipe T is achieved (this position should correspond to the placement of the arm DSA) the roller 23 is returned to contact and support the pipe T and the arm DSA is first moved axially backward along the axis T1—T1 and then is rotated about that axis to bring the roller 22 into upward position. The axial displacement of the arm DSA is then reversed and the compression spring is released in order to bring the roller 22 into contact with the interior flange 51.

USE OF THE CUTTING PROCESS AND EQUIPMENT

Figure 8:
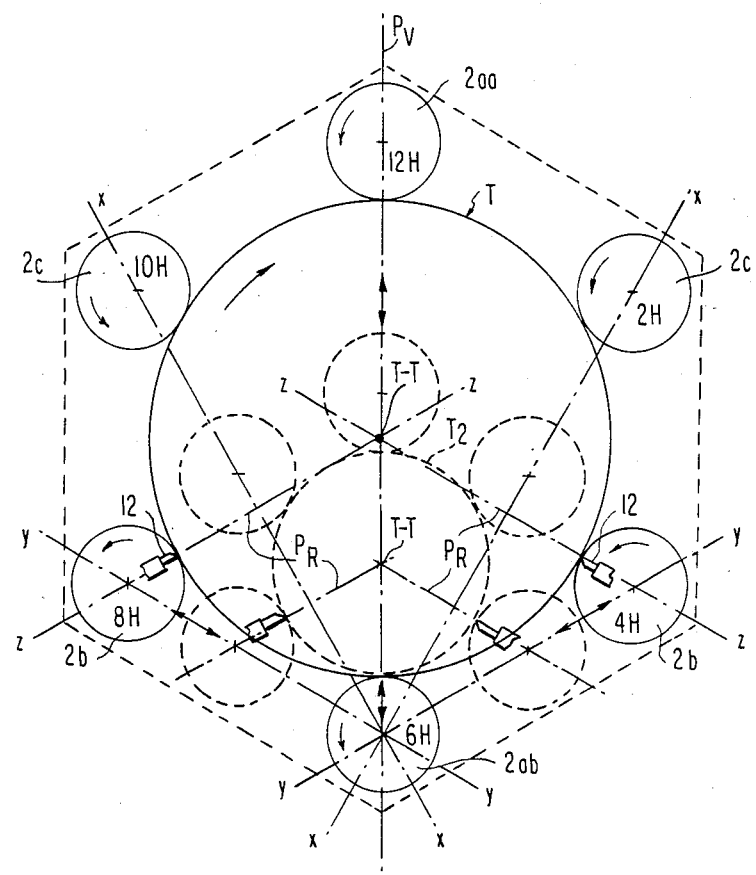
FIG. 8 is a schematic end elevation of the cutting means illustrating the ability of said means to adapt automatically to tubular products of different diameters.

The use of the process and means that have just been described will now be indicated. If the tubular piece T has been suitably positioned in height and length by operation of the vertical handling unit B and the axial support unit C, then the cutting process occurs as follows. First, the lower side rollers 2b at four o'clock and at eight o'clock are simultaneously advanced along axes y—y toward six o'clock, as illustrated in FIG. 8 by solid and broken lines, for the retracted and advanced positions respectively of the rollers 2b. The position in solid lines corresponds to a pipe T with a large diameter, which is likewise represented in unbroken lines, while the position of rollers 2b shown in broken lines corresponds to a pipe $T_2$ with a diameter that is much smaller than that of pipe T. Rollers 2b descend through the sliding of their support carriage 6 over the sloping surfaces 30. The descent is controlled by reduction gears 11, which are themselves controlled by a programmed automatic system that is in itself known and is not represented. The descent of rollers 2b continues until the carriages 6 receive the stop order from the automatic control system, i.e., when rollers 2b come into contact with the surface $T_1$ of pipe T. Then the dolly 19 is lowered as far as it will go and the pipe T comes to rest on rollers 2b.

The pipe T is gripped within the set of six rollers 2aa, 2ab, 2b and 2c under the pressure of four actuator cylinders 5. The pipe T is set into rotation about its axis T—T by rollers $2aa$, $2ab$ and $2c$ which are themselves driven in rotation by their respective motors 3. The direction of rotation of the rollers is symbolized by the arrows in FIG. 1. Then, as shown in FIG. 3, the cutting tools 12 are incrementally, step-by-step advanced along radial displacement axes z—z toward the axis T—T of the pipe T, all under the control of pulses sent by the automatic control system. Each tool 12 advances under the foce of the axial thrust of its support nut 16, which is itself driven by motor 13 through the coupler 14 and screw 5. The rotational motion of the motor 13 is thereby transformed into an axial translational motion of the tool-holding nut 16. Each tool 12 is off-set with respect to the other by a set distance by the automatic mechanism, corresponding to the optimal machining of the material at hand. The number of steps and cuts for each tool 12 is optimized by the automatic control mechanism as a function of the diameter of the tube T, which is measured automatically upon entering the installation. This makes it possible to limit idling time, i.e., tool 12 stops moving toward axis T—T and is backed off almost immediately after having cut through the tube wall $T_1$.

Figure 7:
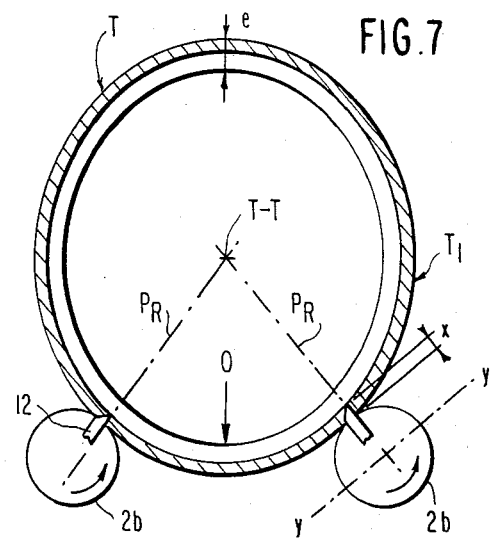
FIG. 7 is a tranverse section of a tube-shaped piece being cut analogous to FIG. 6 but with the cutting being done by means according to the invention, schematically represented, in which a regular bevel can be obtained.

If the pipe T being cut has an oval or elliptical crosssection as is illustrated with exaggertion in FIG. 7, the penetration x of the tools 12 remains regular and constant over the entire periphery of the tube T by virtue of the mechanical pairing of each tool 12 with the corresponding support roller $2b$. As a result, the cutting edge $12a$ and the tangent point G between the roller $2b$ and pipe T lie in a radial plane passing through axis T—T, as explained above. The tool-holders 16 situated at four and eight o'clock are directed radially with respect to the section to be cut and move radially along the axes z—z, step-by-step, for the same number of steps counted from the tangent point G between rollers $2b$ and surface $T_1$. This is true regardless of the radial variation of the pipe T (if the latter is oval), since the lower side roller $2b$, mechanically paired to the tool-holder 16, remains in contact with the surface $T_1$ of the pipe T. In other words, the penetration of the cutting tool 12 into the surface $T_1$ remains constant as measured from the outer surface of the pipe T whatever the radius of curvature of the oval section O, shown in FIG. 7, since this penetration is measured from the tangent point G.

Figure 6:
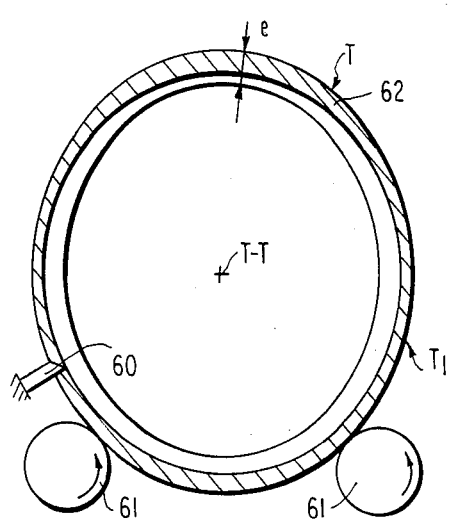
FIG. 6 is a transverse section of a pipe being cut by conventional means, schematically represented, and showing the irregularity of the bevel obtained.

Under these conditions, a bevel of rigorously constant width x is obtained over the entire periphery of the oval pipe T, as seen in FIG. 7. In comparison with the prior art, illustrated in FIG. 6 in which the cutting tool 60 is mechanically separated from the support rollers 61, and thus not paired with the latter as in this invention, the prior art cutting edge executes a bevel 62 of irregular width in the oval pipe T. Despite a regular radial progression of the cutting edge in the prior art tool toward the axis of rotation of the pipe T, the penetration of this edge into the surface of the pipe is irregular, being smaller where the radius of curvature diminishes and greater where the radius of curvature of the section increases. This is explained by the fact that cutting tool 60 is constant in its radial, step-by-step approach toward axis of rotation T—T, whereas the oval shape of the pipe entails variation in the initial separation of cutting edge from the surface being cut.

Of course, FIG. 7 represents an intermediate stage of cutting, whereas tools 12 have penetrated into surface $T_1$ to a depth of x. The cut is naturally complete when tools 12 have penetrated through the entire thickness e of the surface $T_1$. At this point, the tools are drawn back into the retracted position represented in FIG. 3 to await the next cutting operation.

When the diameter of the tube T to be cut varies, the position of the rollers, with the exception of lower center roller $2ab$, is changed in the following manner as illustrated in FIG. 8. In sequence, each pair of tool 12 and lower side roller $2b$ pair is moved along its y—y axis by the sliding carriage 6 over the sloping surface 30 until the rollers $2b$ come into contact with the surface of the pipe $T_2$, while remaining symmetrical relative to the roller $2ab$ at six o'clock. The orientation along lines z—z of tool supports 7 is of course maintained during the translation of the pairs of tool 12 and roller $2b$ at an angle of 60 degrees to the twelve o'clock/six o'clock direction. Thus, cutting edges $12a$ still lie in the radial planes $P_R$ containing the axis T—T and tangent point of contact G.

The upper side rollers $2c$ are then lowered by activation of their control cylinders 5 along the axes x—x. The V orientation of the ten o'clock and two o'clock actuator cylinders enables the corresponding rollers $2c$ to continue to find the necessary space on the periphery of tubular section $T_2$ to be cut by increasing the displacement of the rollers at twelve, four and eight o'clock when the diameter of pipe T diminishes. If the upper side rollers $2c$ (ten and two o'clock) were moved at an angle of 60 degrees, i.e., radially toward the axis of rotation T—T, these two rollers would quickly become blocked against roller $2aa$ at twelve o'clock as the tubular section decreased in size, with the result that rollers $2c$ cannot be brought any closer and one would have to be satisfied with guiding the tubular section with four rollers instead of six.

This feature of the mounting and orientation of the upper side rollers $2c$ thus constitutes an important advantage of the invention.

After the cut is made, the cut remnant of the pipe T is removed and tools 12 are drawn back into their retracted rest position (FIG. 3), i.e., where edge $12a$ is backed off slightly, by a distance b, from the tangent line t of the periphery of the corresponding roller $2b$. The upper side rollers $2c$ and upper roller $2ab$ are then withdrawn as far as they will go by their respective actuator cylinders 5.

Dolly 19 is raised until it supports pipe T in the place of the lower side rollers $2b$. The latter are retracted along the axes y—y by the movement of their support carriages 6. The lower center roller $2ab$ is lowered. Lastly, grip roller 22 is released and the pipe T is removed by a handling means that is in itself known and is not represented.

The process and means of the invention offer the following important advantages.

1. First, as already indicated, the joining of each cutting tool 12 with a roller $2b$ by mechanical pairing in the manner described above, which guarantees the gradual radial movement of the tool 12 and roller $2b$ pair during cutting, makes it possible to obtain a machined profile (bevel, fillet, etc.) that will be perfectly regular regardless of the variation in the radius of curvature of the pipe T. The latter may therefore be oval or elliptical. 2. The cutting edge $12a$ of each tool remains in the radial plane $P_R$ of the section being cut. During the cutting operation, the plane $P_R$ passes through the axis of each roller $2b$ on a side of the tube T. Whatever the diameter of the pipe, this radial arrangement is retained by virtue of the tool-holding carriage 6 being mounted on the inclined surface 30, which enables translation in the y—y direction. 3. The degree of retraction of the tool 12 relative to the tangent line t at the point of contact between roller 2b and surface $T_1$ is very slight (the distance b). This considerably limits the loss of time in passing from the rest phase to the work phase. 4. It is possible to increase the number of tools 12 on the condition that the rule of maintaining cutting edge 12a in line with the roller 2b/pipe T contact, and in a radial plane $P_R$ of the section to be cut, is respected. A tool could thus be placed at six o'clock. Another could be placed at twelve o'clock. 5. The cutting device A is universal with regard to the admission of various diameters of pipes T by virtue of the arrangement and orientation of the actuator cylinders 5 and the tool-holding carriages 6. 6. It is possible to optimize the number of carrier rollers (for pipe and cutting tools), the motors and the gripping elements depending on the diameter, thickness, and hardness of the material being machined. While also taking into consideration the risks of deformation of the pipe and the drive torques of the latter as a function of the reaction imposed by the cutting tools. 7. The incremental advance of tools 12 makes it possible to know their position at all times by virtue of the post-selection reversible counter that controls each tool. By virtue of the incremental powering of the tools, it is possible to optimize the length of the steps and the number of cuts for a given machining operation, thus yielding savings of time and energy by avoiding idle cutting passes. 8. The maintenance of axial position of the pipe T using three rollers 22 and 23, including one grip roller 22 having an appropriate profile, makes it possible to accept pipes T with end portions 21 having various profiles.

The invention is not limited to the embodiment described above and may include numerous variants of implementation, Thus, the number of rollers and their angular orientation may be varied. Similarly, the pairs formed by tools 12 and the corresponding roller 2b may be moved along axes y—y by any other means equivalent to those described and axis z—z may lie in any radial plane $P_R$.

I claim:

1. Apparatus for cutting tubes (T), comprising:
   a stationary frame (1) having an opening (10) through which the tube (T) to be cut lies horizontally.
   rotational driving means (3);
   a series of rollers (2aa, 2ab, 2b) fastened onto the frame (1) and the axis of each said roller being parallel to a first longitudinal axis, said longitudinal axis being parallel to the longitudinal axis of said tube, whereby said rollers support and maintain said tube at least one of said rollers being connected to said driving means and turning said tube (T) about its longitudinal axis (T—T), whereby the tube (T) remains translationally stationary;
   a lower center roller (2ab) and at least one roller being an upper side roller (2c) adjustable along an axis (x—x) perpendicular to a horizontal line lying in the axial vertical plane containing said first longitudinal axis and forming the axis of rotation (33) of said lower center roller, said perpendicular axis (x'x) being inclined (α) relative to said axial vertical plane.
   at least one cutting tool (12);
   means for adjusting said cutting tool along a first line perpendicular to and passing through said first longitudinal axis, for cutting the tube;
   a common support-piece (20) connected to said cutting tool and supporting one roller supporting said tube (2b) of said series of rollers; and
   means for moving said support-piece within a plane, the normal of which is perpendicular to said first longitudinal axis, said cutting tool and said one roller being mechanically paired in the direction of said first line.

2. Cutting apparatus, as recited in claim 1, wherein each cutting tool (12) is provided with a cutting edge (12a) positioned essentially in a first plane ($P_R$) containing said first longitudinal axis (T—T) and a tangent point (G) of contact at an intersection of said first line and said one roller roller (2b), and further comprising means for moving said cutting edge perpendicularly to said first longitudinal axis (T—T) within said first plane.

3. Cutting apparatus, as recited in claim 1, wherein the pair formed by said cutting tool (12) and said one roller (2b) is mounted on a support carriage (6) and further comprising a stationary box frame (31) having a sloping surface (3) inclined toward a vertical plane containing said first longitudinal axis (T—T) and means for moving said support carriage over said sloping surface.

4. Cutting apparatus, as recited in claim 2, wherein the pair formed by said cutting tool (12) and said one roller (2b) is mounted on a support carriage (6) and further comprising a stationary box frame (31) having a sloping surface (3) inclined toward a verticl plane containing said first longitudinal axis and means for moving said support carriage over said sloping surface.

5. Cutting apparatus, as recited in claim 1, wherein said series comprises six rollers (2aa, 2ab, 2c) supporting said tube (T) to be cut and adjustable in their position whereby the adapt to tubes of various diameters, two (2b) of said rollers being each paired mechanically to a cutting tool (12) and mounted under and on either side of said first longitudinal axis so as to be symmetrical with respect to the axial vertical plane containing the first longitudinal axis, and two rollers (2b) being movable, together with corresponding cutting tools (12), along axes (y—y) parallel to the inclined surface (3) supporting each cutting tool (12/roller (2b) pair and converging near the axis (33) of the lower center roller, a fourth roller being an upper center roller (2a) being set above the first longitudinal axis and a fifth and sixth roller being upper side rollers (2c) mounted on either side of said upper center roler (2aa).

6. Cutting apparatus as recited in claim 5, wherein said two upper side rollers (2c) are adjustable along axes (x—x) forming a V symmetrical with respect to the axial vertical plane ($P_V$) containing the first longitudinal axis and contained in a plane that is perpendicular to said axial vertical plane, said V axes (x—x) intersecting near the axis (33) of the lower center roller (2ab), the upper and lower center rollers (2aa, 2ab) being radially adjustable in said axial, vertical plane.

7. Cutting apparatus, as recited in claim 1, further comprising: an upper center roller being vertically adjustable in said vertical axial plane; cylinders (5) affixed to said frame (1) and having rods (4); and motors (3) borne on said rods; and wherein the upper and lower center rollers (2aa, 2ab) and the upper side rollers (2c) are mounted on said rods and are driven in rotation by said motors.

8. Cutting apparatus, as recited in claim 6, further comprising: cylinders (5) affixed to said frame (1) and having rods (4); motors (3) borne on said rods; and wherein the upper and lower center rollers (2aa, 2ab) and the upper side rollers (2c) are mounted on said rods and are driven in rotation by said motors.

9. Cutting apparatus for cutting a tube (T) having a socket (21) as recited in claim 1, further comprising lower support rollers (23) and an inside roller (22), said lower support rollers and said inside roller having axes located vertically lower than and parallel to said first longitudinal axis for accommodating a wall of a socket of said tube between said inner roller and said lower support rollers, said inside roller having an annular groove (22a) fashioned so as to receive the corresponding inner profile of said socket, thereby holding the socket (21) of the tube (T) against the lower support rollers (23), said lower support rollers and said inside roller supporting an end of said tube away from said series of rollers.

10. Cutting apparatus for cutting a tube (T) having a socket (21), comprising:
    a stationary frame (1) having an opening (10) through which the tube (T) to be cut lies horizontally,
    rotational driving means (3);
    a series of rollers (2aa, 2ab, 2b) fastened onto the frame (1) and the axis of each said roller being parallel to a first longitudinal axis, said longitudinal axis being parallel to the longitudinal axis of said tube, whereby said rollers support and maintain said tube, at least one of said rollers being connected to said driving means and turning said tube (T) about its longitudinal axis (T—T), whereby the tube (T) remains translationally stationary;
    lower support rollers (23);
    an inside roller (22), said lower support rollers and said inside roller having axes located vertically lower than and parallel to said first longitudinal axis for accommodating a wall of a socket of said tube between said inner roller and said lower support rollers, said inside roller having an annular groove (22a) fashioned so as to receive the corresponding inner profile of said socket, thereby holding the socket (21) of the tube (T) against the lower support rollers (23), said lower support rollers and said inside roller supporting an end of said tube away from said series of rollers;
    at least one cutting tool (12);
    means for adjusting said cutting tool along a first line perpendicular to and passing through said first longitudinal axis, for cutting the tube;
    a common support-piece (20) connected to said cutting tool and supporting one roller supporting said tube (2b) of said series of rollers; and
    means for moving said support-piece within a plane, the normal of which is perpendicular to said first longitudinal axis said cutting tool and said one roller being mechanically paired in the direction of said first line.

* * * * *